July 12, 1955

M. P. LEBOURG 2,712,697

BOREHOLE GAUGE

Filed March 30, 1954

INVENTOR.
MAURICE P. LEBOURG
BY Robert Hockfield
HIS ATTORNEY

July 12, 1955

M. P. LEBOURG 2,712,697

BOREHOLE GAUGE

Filed March 30, 1954

INVENTOR.
MAURICE P. LEBOURG
BY Robert Hockfield
HIS ATTORNEY

United States Patent Office 2,712,697
Patented July 12, 1955

2,712,697

BOREHOLE GAUGE

Maurice P. Lebourg, Houston, Tex., assignor to Schlumberger Well Surveying Corporation, Houston, Tex., a corporation of Delaware Application March 30, 1954, Serial No. 419,740

11 Claims. (Cl. 33—178)

This invention relates to apparatus for gauging the size of boreholes and, more particularly, pertains to an improved borehole gauge for determining in a simple and highly effective manner the size of boreholes drilled into the earth.

One type of borehole gauge employed heretofore comprises a wall-engaging member, generally having a plurality of sensing arms adapted to expand and contract laterally to follow changes in the borehole diameter and an electrical circuit element controlled by the sensing arms. The electrical circuit element may, for example, be a variable resistor and variations in borehole diameter are observed as variations in the electrical resistance of the circuit element.

In adapting gauges of this type for use in deep wells where high pressures and temperatures exist, various types of packing glands and stuffing boxes are frequency employed to prevent leakage of borehole fluid into parts of the apparatus where it might damage or adversely affect the electrical system. This is particularly difficult if mechanical movement of the sensing arms must be transmitted through a pressure-tight housing to effect variations in the electrical circuit element.

It is, therefore, an object of the present invention to provide an improved borehole gauge that is not subject to the deficiencies of apparatus of the type described above.

Another object of the present invention is to provide an improved borehole gauge which does not require a motion-transmitting opening in its pressure-tight housing.

Yet another object of the present invention is to provide an improved borehole gauge which is relatively simple and inexpensive to construct, and yet is entirely reliable in operation.

The borehole gauge in accordance with the present invention comprises a fluid-tight housing adapted to be moved through a borehole and having a longitudinal axis. A first magnetic circuit element is positioned exteriorly of the housing and is longitudinally movable with respect thereto, and a second magnetic circuit element is positioned interiorly of the housing and is rotatably movable with respect thereto. Each of the first and second magnetic circuit elements includes one of a pair of coacting pole sections of opposite magnetic polarities, and one of these pole sections has a portion disposed in a plane angularly positioned relative to the longitudinal axis of the housing. Means are provided for longitudinally displacing the first magnetic circuit element in response to variations in the diameter of the borehole, thereby to effect rotational movement of the second magnetic circuit element. The apparatus further includes means for indicating rotation of the second magnetic circuit element relative to a reference position.

In a particular embodiment of the invention, the first magnetic circuit element includes a pair of pole sections spaced from one another along a plurality of lines substantially parallel to the longitudinal axis of the housing, and the second magnetic circuit element is a horseshoe type magnet having its legs constituting a pair of pole sections for the second magnetic circuit element.

In another embodiment of the invention, the first magnetic circuit element includes a pair of pole sections spaced from one another along a plurality of lines substantially perpendicular to the longitudinal axis of the housing and the second magnetic circuit element is a bar-type magnet having its end poles constituting a pair of pole sections for the second magnetic circuit element.

The novel features of the present invention are set forth with particularity in the appended claims. The present invention, both as to its organization and manner of operation, together with further objects and advantages thereof, may best be understood by reference to the following description taken in connection with the accompanying drawings in which:

Figure 1:
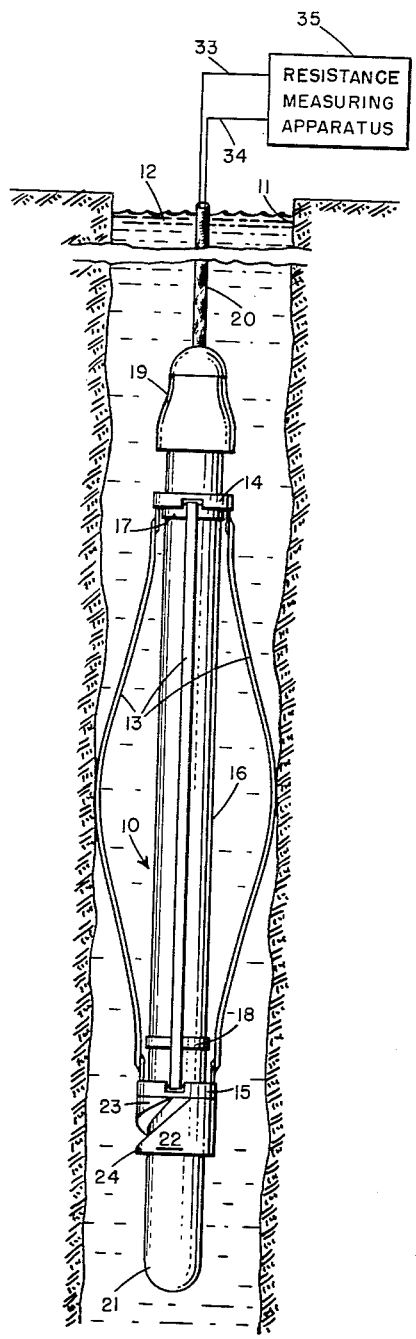
Fig. 1 is a schematic diagram illustrating apparatus constructed according to the invention for providing indications of variations in the size of a borehole.

In Fig. 1 of the drawings, a borehole gauge 10 constructed in accordance with the present invention is shown located at a given depth in a borehole 11. The borehole 11 may contain a column of drilling fluid 12, such as an oil base or water base mud. However, in some cases, no liquid is present.

The apparatus 10 comprises a plurality of angularly spaced, arched springs 13 which are pivotally connected at their upper and lower extremities, respectively, to junctions which may be in the form of members or collars 14 and 15. Although the apparatus of Fig. 1 is intended to employ four of springs 13, it is to be understood that any desired number may be used. The collars 14 and 15 are slidably mounted on a tubular pressure-tight housing 16 on which are secured longitudinally spaced stop members 17 and 18 which permit restricted longitudinal movement of the collars 14 and 15 with respect to the member 16.

Tubular member 16 is secured at its upper end to a head member 19 which is connected to a supporting cable 20 in a conventional manner. The lower end of tubular member 16 is provided with a rounded portion 21 for convenience in running the assembly into the borehole.

With the construction just described, it is apparent that when borehole gauging apparatus 10 is lowered through borehole 11, collar 15 is held against movement by stop member 18 while collar 14 is free to move longitudinally in accordance with variations in the size of the borehole. Conversely, as the borehole gauging apparatus 10 is raised through the borehole, collar 14 engages and is restrained by stop member 17 while the lower collar 15 is free to move longitudinally according to variations in the size of borehole 11. This type of construction permits the lowering and raising of the borehole gauge with ease. A suitable keying arrangement (not shown) is provided for preventing relative rotation between collar 15 and housing 16 as the apparatus is moved through the borehole.

Figure 2:
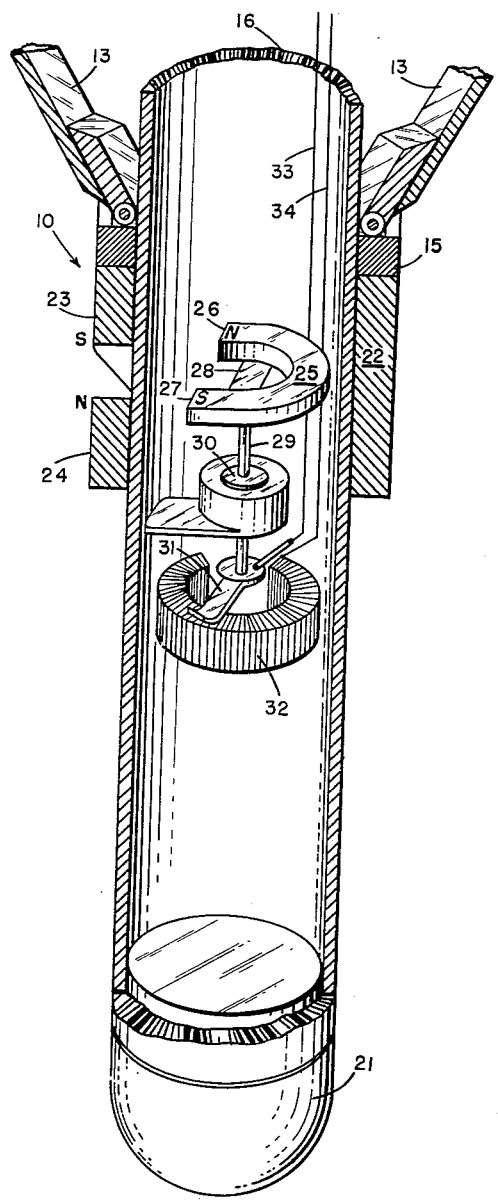
Fig. 2 is a perspective view of the lower portion of the apparatus shown in Fig. 1, drawn to an enlarged scale, certain parts thereof being shown cut away to reveal interior details.

Housing 16 preferably is constructed of a non-magnetic material and is received by a first, sleeve-type magnetic circuit element 22 arranged for longitudinal, sliding movement along the exterior surface of the housing. A suitable mechanical bond is provided so that sleeve 22 moves as a unit with collar 15. Element 22 includes a pair of pole sections 23 and 24 of opposite magnetic polarities and of substantially spiral configuration relative to a longitudinal axis for housing 16. As best seen in Fig. 2, pole sections 23 and 24 are spaced from one another along a plurality of lines substantially parallel to the longitudinal axis of housing 16. Although any polarity assignment may be made, it is assumed that pole section 23 is a south pole and that pole section 24 is a north pole.

Borehole gauge 10 further includes a second magnetic circuit element 25 positioned interiorly of housing 16. Element 25 is a horse-shoe type magnet having its legs 26 and 27 constituting a pair of pole sections of opposite magnetic polarities arranged to coact in opposed polarity relation with the pole sections 23 and 24 of magnetic circuit element 22. Thus, pole 26 is a north pole and pole 27 is a south pole. Magnet 25 is secured to a support 28, in turn, supported by a vertical shaft 29 aligned with the longitudinal axis of housing 16 and rotatably mounted by means of a bearing 30 that is secured within housing 16. Accordingly, magnetic circuit element 25 is rotatable about the longitudinal axis of the housing.

It is evident from the foregoing description that the first and second magnetic circuit elements 22 and 25 include a pair of coacting pole sections, for example, 23 and 26, of opposite magnetic polarities and that one of these pole sections, 23 in this case, has a portion disposed in a plane angularly positioned relative to the longitudinal axis of housing 16. Since the magnetic forces of attraction cause magnet 25 to assume a position of least reluctance for coacting poles 23, 26 and 24, 27, as the first magnetic circuit element 22 is displaced longitudinally in response to variations in the diameter of the borehole by means of springs 13, rotational movement of the second magnetic circuit element 25 is effected.

In order to obtain indications of rotation of the second magnetic circuit element 25 relative to a reference position, the lower extremity of shaft 29 is mechanically coupled to movable contact 31 of a rheostat having a resistance element 32. Contact 31 and one end of resistance element 32 are connected to conductors 33 and 34 which traverse housing 16 and extend through cable 20. At the surface of the earth, conductors 33 and 34 are connected to any suitable resistance-measuring apparatus 35. By employing a recording-type indicator in apparatus 35 having a recording medium that is displaced in synchronism with movement of the gauging apparatus 10 along borehole 11, a continuous caliper log of the borehole may be obtained.

It is evident that when the position of springs 13 is such that magnetic circuit element 22 is at its lowermost position, representing a borehole of small diameter, element 25 is rotated to bring contact 31 to a position of minimum resistance in rheostat 31, 32. Conversely, for a borehole of large diameter, element 22 moves to an upper limit and the resistance of rheostat 31, 32 is at a maximum value. By proper design, the apparatus can be constructed so that these extreme conditions obtain for the minimum and maximum borehole diameters in which calipering operations are to be conducted. Accordingly, resistance-measuring apparatus 35 provides indications of variations in the size of borehole 11 between the extreme limits.

In operation, borehole gauge 10 is lowered in the borehole 11 to a desired depth at which calipering is to begin. Thereafter, it is raised in the borehole, and collar 14 engages and remains fixed against stop 17, while lower collar 15 moves longitudinally in accordance with variations in the size of the borehole. Magnetic circuit element 22 moves together with collar 15, and magnetic circuit element 25 rotates to assume a position of least reluctance between poles 23, 24, 26 and 27. Thus, shaft 29 is rotated in accordance with longitudinal movement of collar 15. The resulting variations in the resistance of rheostat 31, 32 are measured and recorded by apparatus 35 at the surface of the earth to provide a curve that is representative of variations in the size of the borehole 11.

Obviously, rheostat 31, 32 may be designed for any desired function of resistance versus shaft rotation. Accordingly, non-linear relationships in the mechanical or electrical portions of the system may be compensated so as to provide an indication which varies directly with borehole diameter.

For example, a linear potentiometer may be provided and its movable contact connected to lead 33 while both ends of its resistance element are connected to lead 34. In this way, a non-linear relationship of shaft rotation versus resistance is achieved to accommodate, in part, the non-linear relationship of longitudinal position of collar 15 versus borehole diameter inherent in the bowed-spring arrangement.

Of course, measurements may be made with equal facility as the apparatus is lowered in the borehole. This may be accomplished by suitably associating magnetic circuit elements 22 and 25 with collar 14.

While a variable rheostat has been illustrated, any other type of electrical circuit element may be employed for translating mechanical rotation of shaft 29 to an electrical quantity. For example, a variable condenser may be employed.

Alternatively, a variable resistor or variable condenser may be utilized to control the frequency of an oscillation generator supported within housing 16. In this case, apparatus 35 is replaced by a suitable frequency-measuring device.

Figures 3, 4, 5:
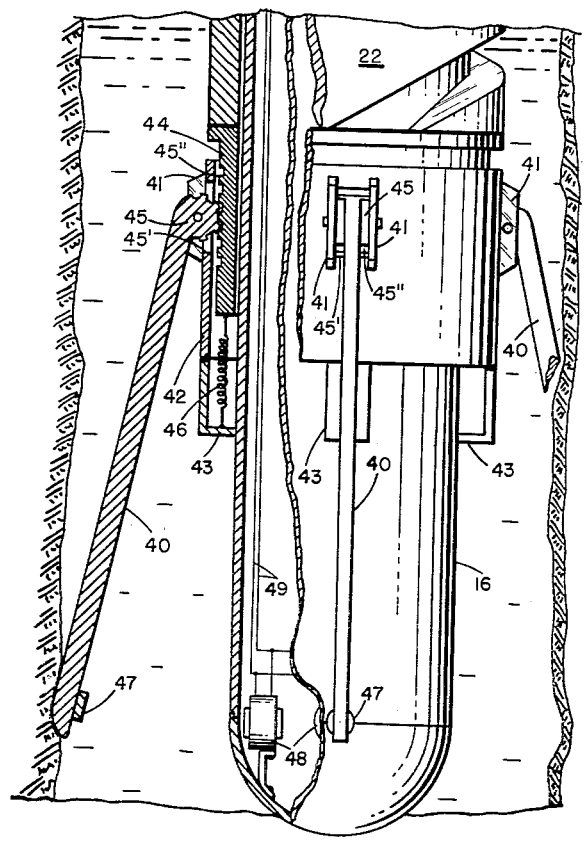
Fig. 3 is a schematic diagram, shown partially in longitudinal section, of a modification which may be made to the apparatus of Fig. 1.
Fig. 4 represents, schematically, another embodiment of the invention, as may be incorporated in the apparatus of Fig. 1, but drawn to an enlarged scale.
Fig. 5 is a perspective view of the modified apparatus illustrated in Fig. 4, portions thereof being shown cut away and in section to reveal certain interior details of the apparatus.

In the modification of the apparatus illustrated in Fig. 3, elements which have counterparts in Figs. 1 and 2 are represented by the same reference numerals. Instead of bowed springs 13, a plurality of sensing arms 40 are pivotally connected to housing 16 by pairs of confronting supports 41 which extend radially from a tubular member 42 secured by L-shaped brackets 43 to the housing. Member 42 has an inner diameter larger than the diameter of housing 16 and a sleeve 44 is interposed between the tubular member and the housing, being slidably supported on the exterior surface of the housing. Sleeve 44 is mechanically connected to the lower end of magnetic circuit element 22.

The upper extremity of each of legs 40, at which it is pivoted, is provided with a segmental gear 45 that extends through a respective one of openings 45' into meshing engagement with a corresponding one of a plurality of racks 45", each of which extends longitudinally along sleeve 44. Accordingly, pivotal movement of the arms 40 causes longitudinal, sliding movement of the sleeve. A tension spring 46 connected between housing 16 and sleeve 44 biasses the latter in a downward direction thereby pivoting the arms 40 so as to bring their lower extremities into engagement with the sidewall of borehole 11.

In the vicinity of the lower extremity of each of arms 40, an armature or pole piece 47 of magnetic material is secured. Each armature 47 is arranged to coact with one of a plurality of electromagnets of solenoids 48 positioned within housing 16 and energized via conductors 49 by a source of electrical energy (not shown) located at the surface of the earth.

To condition the modified borehole gauge for insertion into a borehole, the arms 40 are pivoted toward housing 16 and the magnets 48 are energized by applying a voltage to conductors 49. The resulting magnetic fields of these solenoids 48, acting on armatures 47, maintain arms 40 in retracted position against the bias of spring 46 while the borehole gauge is lowered into the borehole. In order to condition it for a calipering operation, the electrical circuit to conductors 49 is interrupted to deenergize magnets 48 and spring 46 moves sleeve 44 in a downward direction. Thus a torque is produced on the sensing arms 40 which brings their extremities into engagement with the sidewall of the borehole.

As the apparatus is drawn upwardly through the borehole, variations in the borehole diameter cause pivotal movement of the sensing arms. Through the agency of gears 45 and racks 45″, this is converted to longitudinal movement of sleeve 44 and magnetic circuit element 22, and a caliper log, as explained in connection with Figs. 1 and 2, is obtained.

Although a magnetic type of locking system for the sensing arms has been illustrated, any well-known form of mechanical lock may be provided for maintaining arms 40 in close relationship with respect to housing 16 so as to permit the descent of the apparatus into a borehole to be gauged.

Of course, any alternative type of sensing arm arrangement may be used in place of the bowed spring or pivoted types to effect longitudinal movement of the member 22. For example, a parallelogram system such as described in the copending application of D. F. Saurenman and M. P. Lebourg, entitled "Borehole Apparatus," filed March 30, 1954, Serial Number 419,678, and assigned to the same assignee as the present invention, may be employed together with a linkage connected at its ends to member 22 and to a suitable element of the parallelogram system.

In the embodiment of the invention shown in Figs. 4 and 5, bowed springs 13 of Fig. 1 are connected to a collar 50 of magnetic material which constitutes the first magnetic circuit element for the system. The collar is slidably movable in a longitudinal direction along the exterior surface of housing 16. Thus, collar 15 of Fig. 1 is not required. A pair of pole sections 51 and 52 extend downwardly from collar 50 in spiral relation with respect to housing 16. More specifically, the pair of pole sections 51 and 52 of the magnetic circuit element are spaced from one another along a plurality of lines substantially perpendicular to the longitudinal axis of housing 16.

Supported for rotation within housing 16 by means of a shaft 53 and bearing 54 is a second magnetic circuit element in the form of a bar-magnet 55 having its end poles 56 and 57 constituting a pair of pole sections of opposite magnetic polarities arranged to coact in opposed polarity relation with pole sections 51 and 52 of the first magnetic circuit element. It is evident from the discussion presented in connection with Figs. 1 and 2 that as collar 50 moves longitudinally in response to movement of spring arms 13 with variations in borehole diameter, bar-magnet 55 rotates about the longitudinal axis of the housing to a position of least magnetic reluctance. Accordingly, the rotational position of the bar-magnet relative to a reference position is an indication of the diameter of the borehole.

To make a record of such rotation, a light-sensitive recording medium 58, such as a photographic film strip, is supported within housing 16 for displacement between magazines 59 and 59′ along a given horizontal path "D" in a selected manner that can be related to movement of the housing through the borehole. This movement is effected by a film-spooling mechanism 60 driven by an electric motor. A light bulb 61 disposed below the plane of magnet 55 is arranged to project light energy toward the path of movement of film strip 58.

The apparatus further includes a light-control mechanism disposed within the housing for adjusting a characteristic of the light energy impinging on the recording medium in response to rotation of the second magnetic circuit element 55 relative to a reference position. This mechanism comprises a horizontal disc 62 secured to and rotatable with bar-magnet 55 and having a radial slot 63. Another fixed, horizontal disc 64 is disposed above disc 62 and is provided with a transverse slot 65. Thus, as film strip 58 is displaced along path "D," the position of spot of light "p" on the film strip is displaced transversely of the path "D" by an amount responsive to rotation of magnet 55 and disc 62 from a reference position.

In the event housing 16 is supported in the borehole by a wire line, light bulb 61 and the motor of film-spooling mechanism 60 may be powered by batteries (not shown) contained within the housing. Of course, if desired, cable conductors may be provided for connecting the circuits within the housing with a power source at the surface of the earth.

It is evident that as the apparatus of Figs. 4 and 5 traverses the borehole, a curve is traced on film strip 58 which is a function of the diameter of the hole. After the apparatus is removed from the borehole, the film strip may be suitably treated in a known manner to obtain a permanent record.

It is evident from the foregoing description that, while the several embodiments of the present invention feature a pressure-tight housing for protecting portions of the electrical circuit from damage by drilling fluid 12, a mechanical motion-transmitting element extending through the housing is not needed. Therefore, packing glands and/or stuffing boxes are not required and the deficiencies of certain prior art arrangements are avoided.

Moreover, an inspection of the several figures of the drawings reveals that a borehole gauge embodying the present invention is relatively simple and requires few, easily fabricated parts. Hence, the gauge is inexpensive to construct, although it is entirely effective and reliable in operation.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

I claim:

1. Apparatus for gauging a borehole drilled into the earth comprising a fluid-tight housing adapted to be moved through a borehole, having a longitudinal axis and including a portion constructed of an essentially nonmagnetic material, a first magnetic circuit element positioned exteriorly of said portion of said housing and longitudinally movable with respect thereto, a second magnetic circuit element positioned interiorly of said portion of said housing and rotatably movable with respect thereto, each of said first and said second magnetic circuit elements including one of a pair of coacting pole sections of opposite magnetic polarities, and one of said pole sections having a portion disposed in a plane angularly positioned relative to said longitudinal axis, means for longitudinally displacing said first magnetic circuit element in response to variations in the diameter of the borehole thereby to effect rotational movement of said second magnetic circuit element, and means for indicating rotation of said second magnetic circuit element relative to a reference position.

2. Apparatus for gauging a borehole drilled into the earth comprising a fluid-tight housing adapted to be moved through a borehole, having a longitudinal axis and including a portion constructed of an essentially nonmagnetic material, a first magnetic circuit element positioned exteriorly of said portion of said housing, longitudinally movable with respect thereto, and including a pole section of given magnetic polarity having a portion disposed in a plane angularly positioned relative to said longitudinal axis, a second magnetic circuit element positioned interiorly of said portion of said housing, rotatably movable with respect thereto, and including a pole section of a magnetic polarity opposite to said given polarity disposed for magnetic coaction with said pole section of said first magnetic circuit element, means for longitudinally displacing said first magnetic circuit element in response to variations in the diameter of the borehole thereby to effect rotational movement of said second magnetic circuit element, and means for indicating rotation of said second magnetic circuit element relative to a reference position.

3. Apparatus for gauging a borehole drilled into the earth comprising a fluid-tight housing of non-magnetic material adapted to be moved through a borehole and having a longitudinal axis, a first magnetic circuit element positioned exteriorly of said housing, longitudinally movable with respect thereto, and including a pair of pole sections of opposite magnetic polarities and of substantially spiral configuration relative to said longitudinal axis, a second magnetic circuit element positioned interiorly of said housing, rotatably movable with respect thereto, and having a pair of pole sections of opposite magnetic polarities arranged to coact in opposed polarity relation with said pole sections of said first magnetic circuit element, means for longitudinally displacing said first magnetic circuit element in response to variations in the diameter of the borehole thereby to effect rotational movement of said second magnetic circuit element, and means for indicating rotation of said second magnetic circuit element relative to a reference position.

4. Apparatus in accordance with claim 3 wherein said pair of pole sections of said first magnetic circuit element are spaced from one another along a plurality of lines substantially parallel to the longitudinal axis of said housing and said second magnetic circuit element is a horse-shoe type magnet having its legs constituting said pair of pole sections of said second magnetic circuit element.

5. Apparatus in accordance with claim 3 wherein said pair of pole sections of said first magnetic circuit element are spaced from one another along a plurality of lines substantially perpendicular to the longitudinal axis of said housing and said second magnetic circuit element is a bar-type magnet having its end poles constituting said pair of pole sections of said second magnetic circuit element.

6. Apparatus for gauging a borehole drilled into the earth comprising a fluid-tight housing of non-magnetic material adapted to be moved through a borehole and having a longitudinal axis, a first, sleeve-type magnetic circuit element positioned for longitudinal, sliding movement along the exterior surface of said housing, a second magnetic circuit element positioned interiorly of said housing and rotatably movable with respect thereto about said longitudinal axis, each of said first and said second magnetic circuit elements including one of a pair of coacting pole sections of opposite magnetic polarities, and one of said pole sections having a portion disposed in a plane angularly positioned relative to said longitudinal axis, means for longitudinally displacing said first magnetic circuit element in response to variations in the diameter of the borehole thereby to effect rotational movement of said second magnetic circuit element, and means for indicating rotation of said second magnetic circuit element relative to a reference position.

7. Apparatus for gauging a borehole drilled into the earth comprising a fluid-tight housing of non-magnetic material adapted to be moved through a borehole and having a longitudinal axis, a collar slidably mounted for longitudinal movement on the exterior surface of said housing, said collar defining a first magnetic circuit element positioned exteriorly of said housing and longitudinally movable with respect thereto, a plurality of bowed springs forming a wall-engaging cage about said housing and having one set of adjacent extremities connected to said collar, a second magnetic circuit element positioned interiorly of said housing and rotatably movable with respect thereto, each of said first and said second magnetic circuit elements including one of a pair of coacting pole sections of opposite magnetic polarities, and one of said pole sections having a portion disposed in a plane angularly positioned relative to said longitudinal axis, whereby longitudinal movement of said collar in response to variations in the diameter of the borehole is accompanied by rotational movement of said second magnetic circuit element, and means for indicating rotation of said second magnetic circuit element relative to a reference position.

8. Apparatus for gauging a borehole drilled into the earth comprising a fluid-tight housing of non-magnetic material adapted to be moved through a borehole and having a longitudinal axis, a first magnetic circuit element including a collar of magnetic material slidably mounted for longitudinal movement on the exterior surface of said housing and at least one pole section of given polarity and of spiral configuration, a plurality of bowed springs forming a wall-engaging cage about said housing and having one set of adjacent extremities pivotally connected to said collar, a second magnetic circuit element positioned interiorly of said housing, rotatably movable with respect thereto about said longitudinal axis, and including at least one pole section coacting with said first-mentioned pole section and of a magnetic polarity opposite to said given polarity, and means for indicating rotation of said second magnetic circuit element relative to a reference position.

9. Apparatus for gauging a borehole drilled into the earth comprising a fluid-tight housing adapted to be moved through a borehole, having a longitudinal axis and including a portion constructed of an essentially non-magnetic material, a first magnetic circuit element positioned exteriorly of said portion of said housing and longitudinally movable with respect thereto, a second magnetic circuit element positioned interiorly of said portion of said housing and rotatably movable with respect thereto, each of said first and said second magnetic circuit elements including one of a pair of coacting pole sections of opposite magnetic polarities, and one of said pole sections having a portion disposed in a plane angularly positioned relative to said longitudinal axis, whereby longitudinal movement of said first magnetic circuit element is accompanied by rotational movement of said second magnetic circuit element, and means for deriving an electrical signal having a characteristic of a value representing rotation of said second magnetic circuit element relative to a reference position.

10. Apparatus for gauging a borehole drilled into the earth comprising a fluid-tight housing adapted to be moved through a borehole, having a longitudinal axis and including a portion constructed of an essentially non-magnetic material, a first magnetic circuit element positioned exteriorly of said portion of said housing and longitudinally movable with respect thereto, a second magnetic circuit element positioned interiorly of said portion of said housing and rotatably movable with respect thereto, each of said first and said second magnetic circuit elements including one of a pair of coacting pole sections of opposite magnetic polarities, and one of said pole sections having a portion disposed in a plane angularly positioned relative to said longitudinal axis, a plurality of sensing arms pivotally connected to said housing and arranged to engage the sidewall of the borehole, means for longitudinally displacing said first magnetic circuit element in response to pivotal movement of said sensing arms thereby to effect rotational movement of said second magnetic circuit element, and means for indicating rotation of said second magnetic circuit element relative to a reference position.

11. Apparatus for gauging a borehole drilled into the earth comprising a fluid-tight housing adapted to be moved through a borehole, having a longitudinal axis and including a portion constructed of an essentially non-magnetic material, a first magnetic circuit element positioned exteriorly of said portion of said housing and longitudinally movable with respect thereto, a second magnetic circuit element positioned interiorly of said portion of said housing and rotatably movable with respect thereto, each of said first and said second magnetic circuit elements including one of a pair of coacting pole sections of opposite magnetic polarities, and one of said pole sections having a portion disposed in a plane angularly positioned relative to said longitudinal axis, means for longitudinally displacing said first magnetic circuit element in response to variations in the diameter of the borehole thereby to effect rotational movement of said second magnetic circuit element, a light-sensitive recording medium supported within said housing for displacement along a given path, means for projecting light energy toward said given path, and a light-control mechanism disposed within said housing and responsive to rotation of said second magnetic circuit element relative to a reference position for adjusting a characteristic of light energy impinging on said recording medium.

References Cited in the file of this patent

UNITED STATES PATENTS

| | | |
|---|---|---|
| 2,371,511 | Faus | Mar. 13, 1945 |
| 2,639,512 | Legrand | May 26, 1953 |
| 2,645,027 | Eastman et al. | July 14, 1953 |